United States Patent [19]
Nakamoto et al.

[11] Patent Number: 5,483,118
[45] Date of Patent: Jan. 9, 1996

[54] FIELD EMISSION COLD CATHODE AND METHOD FOR PRODUCTION THEREOF

[75] Inventors: Masayuki Nakamoto, Yokohama; Tomio Ono, Yamato, both of Japan

[73] Assignee: Kabushiki Kaisha Toshiba, Kanagawa, Japan

[21] Appl. No.: 209,928

[22] Filed: Mar. 14, 1994

[30]   Foreign Application Priority Data

Mar. 15, 1993   [JP]   Japan ................................. 5-054018

[51] Int. Cl.$^6$ .................................................. H01J 19/24
[52] U.S. Cl. ........................ 313/309; 313/308; 313/336; 313/351
[58] Field of Search .................................. 313/308, 309, 313/336, 351; 315/169.4

[56]   References Cited

U.S. PATENT DOCUMENTS

| | | | |
|---|---|---|---|
| 5,150,192 | 9/1992 | Greene et al. | 313/309 X |
| 5,319,279 | 6/1994 | Watanabe et al. | 313/309 |
| 5,367,181 | 11/1994 | Yoshida | 313/309 X |

OTHER PUBLICATIONS

"Physical properties of thin-film field emission cathodes with molybdenum cones", Spindt et al., Journal of Applied Physics, vol. 47, No. 12, pp. 5248–5263, Dec. 1976.
"Field Emission from Submicron Emitter Arrays", Sokolich et al., IEDM 90, pp. 159–162, 1990.

*Primary Examiner*—Walter E. Snow
*Assistant Examiner*—Ashok Patel
*Attorney, Agent, or Firm*—Finnegan, Henderson, Farabow, Garrett & Dunner

[57]   ABSTRACT

A field emitter cold cathode has a substrate possessing a first main surface on one side of itself and a second main surface on the other side of itself and has windows formed in itself. An emitter layer is formed on the first main surface side of the substrate, and has emitters disposed at the positions of the windows. A gate electrode layer is formed on the second main surface side of the substrate. In addition, openings are so formed as to enclose untouched the periphery of at least the leading end part of the emitters.

5 Claims, 5 Drawing Sheets

FIELD EMISSION COLD CATHODE AND METHOD FOR PRODUCTION THEREOF

BACKGROUND OF THE INVENTION

This invention relates to a field emission cold cathode for use as in a flat panel display and a method for the production thereof.

In the field of vacuum microelectronics, the development of field emission cold cathodes discharging electrons through minute emitters of a projecting structure is being promoted positively by the utilization of the technology on the fabrication of semiconductors which has been advancing rapidly in recent years.

As a typical example of the outcome of the development, the technique disclosed by C. A. Spint et al. in "Journal of Applied Physics," Vol. 47, 5248 (1976) has been found as widespread recognition.

The method for producing a field emission cold cathode by this technique is illustrated in FIG. 9. This method produces the field emission cold cathode as follows.

First, a $SiO_2$ layer 203 is formed on a Si single crystal substrate 201 by the technique of depositing such as CVD. A Mo layer 205 destined to serve as a gate electrode and an Al layer 207 destined to serve as a sacrifice layer are formed thereon as by the technique of spattering and the technique of oblique vacuum deposition, and then an opening 211 approximately 1.5 μm in diameter is incised in the superposed layers as by the technique of etching as illustrated in FIG. 9A.

Then, a metal such as, for example, Mo which is destined to serve as the material for an emitter 213 is vacuum deposited on the Si single crystal substrate 201 in a direction perpendicular to the Si single crystal substrate 201 while keeping the whole of the Si single crystal substrate 201 in rotation, with the result that the metal (Mo) is deposited in a conical shape in the opening 211 and allowed eventually to form the emitter 213 as illustrated in FIG. 9B. Since the metal (Mo) is gradually deposited meanwhile on the sacrifice layer 207, the opening 211 is occluded with the growth of the emitter 213. The formation of the emitter 213 is terminated when the opening 211 is wholly occluded.

Thereafter, the metal (Mo) layer, the sacrifice layer 207, etc. which have been deposited are removed to expose the gate electrode layer 205 as illustrated in FIG. 9C. Thus, a field emission cold cathode possessed of the conical shape emitter 213 is formed.

Then, the principal part of a device is formed by having an anode (omitted from illustration) opposed across a desired interval to the emitter 213.

The structure of the conventional field emission cold cathode and the method employed for the production thereof, however, mainly entail the following problems.

In the conventional method, the deposition of a metal for the conical shape emitters in the opening 211 is effected while keeping the whole of the Si single crystal substrate 201 in rotation. Since the formation of the emitter 213 is controlled by utilizing the gradual occlusion of the opening 211, it is extremely difficult to attain accurate control of the shape of the tip of the emitter 213, the height of the emitter 213, etc. The emitters 213 in each of the field emission cold cathodes thus produced, betray bad uniformity in the shape and the height and, consequently, the production of field emission cold cathodes suffers from a poor yield because of inferior reproducibility of the shape of the emitters. Particularly, when a multiplicity of field emission cold cathodes of one identical shape are to be arrayed on one and the same substrate, therefore, the cost of production is conspicuously high.

Further, owing to the bad uniformity in the shape and the size of the emitters 213, the uniformity of field emission is low. Moreover, since the emitters 213 are deficient in the sharpness of tip which is necessary for field emission, the field emission cold cathodes suffer from unduly low field emission efficiency and unduly large electric power consumption.

The conventional technique forms the $SiO_2$ layer 203 in a large thickness as by the CVD, superposes the gate electrode layer 205 thereon, and, in the subsequent formation of the emitter 213 thereon, deposits the metal as the material for the emitter 213 once and removes the deposited metal afterward. Thus, the distances between the gates and the emitters which constitute one main factor for deciding the field emission efficiency cannot be easily controlled accurately. In the field emission cold cathodes to be produced by the conventional method, therefore, the field emission efficiency and the operating characteristics are both dispersed widely.

SUMMARY OF THE INVENTION

The object of this invention, therefore, is to provide a field emission cold cathode which exhibits high field emission efficiency, excels in uniformity of emitter shape, permits ample freedom of increase in surface area, enjoys high yield of production, and abounds in efficiency of production.

The field emission cold cathode of this invention is designed to emit electrons through minute emitters of a projecting structure and is characterized by comprising a substrate possessing a first main surface on one side thereof and a second main surface on the other side thereof and having windows formed therein, an emitter layer formed on the first main surface side of the substrate and having emitters disposed at the positions of the windows, and a gate electrode layer formed on the second main surface side of the substrate and having openings so formed as to enclose the periphery of at least the leading end part of the emitters without contact.

The method of this invention for the production of a field emission cold cathode is characterized by comprising a step of providing holes into a first main surface side of a substrate, a step of forming a first insulation layer having dents of the shape of a sharply pointed cone formed in the holes on the first main surface side of the substrate containing the holes, a step of incising windows from a second main surface side of the substrate opposite to the first main surface side thereof at the positions corresponding to those of the holes of the substrate thereby exposing part of the second main surface side of first insulation layer through the windows, and a step of forming an emitter layer having emitters with sharp point at the leading end part thereof formed in conformity with the contour of the first main surface side of the first insulation layer on the first main surface side of the first insulation layer.

The shape of emitter mentioned above is only required to be that of a cone sharply pointed at the leading end part thereof. For example, these emitters may be formed in the shape of a pyramid of a square base, a cone, or a spindle. The gate electrode layer is desired to be formed as extended substantially parallelly to the surface contour of the emitters, opposed to the emitters across a interval, and allowed to enclose the leading end parts of the emitters.

The emitters may be formed so that the leading end parts thereof are exposed and the greater parts thereof other than the leading end parts are covered with the first insulation layer. They may be otherwise so formed that substantially the whole of the emitters and not the leading end parts only thereof are exposed.

These details of structure may be set in due consideration of various factors as the distance between the gate electrode and the leading end parts of emitters and the shape and size of the emitters so that the field emission cold cathode to be obtained by this invention fulfills such characteristics as are required of a device for which the cathode is to be used.

When the field emission cold cathode of this invention is to be used in a device, it is put to use as combined with an anode. In this case, the anode is required to be so disposed that the holes formed therein are opposed to the leading end parts of the emitters. The distance between the anode and the leading end parts of the emitters, the shape of the anode, etc. may be properly set by the method used for an ordinary anode so as to suit the characteristics which are required of a device intended to use the field emission cold cathode.

The aforementioned first insulation layer may be formed, for example, by thermally oxidizing the surface of the silicon single crystal substrate or other methods. In particular, when the first insulation layer is formed by the technique of thermal oxidation, the bottom part of the window on the first insulation layer acquires an extremely sharp pointed shape as shown in FIGS. 1D–2I. Therefore the leading end part of an emitter obtained by depositing emitter material therein is also formed in a sharp pointed shape suitable for improving the emitter performance. As a result, the field concentrating effect of the leading end part of the emitter can be remarkably enhanced.

Unlike an insulation film formed by means of deposition methods such as the CVD and the electron beam deposition, a thermally oxidized insulation layer gets rid of a pin hole, leakage current or the like, being a high-quality insulation layer with twice or three times as high voltage proof as that of the conventional insulation layer. Since the number of short circuiting defects is decreased, the gate electrode and the emitter can be formed close to each other under precise control of the distance therebetween. By controlling the time and temperature of the thermal oxidation process, the aforementioned distance can be accurately controlled.

The method of this invention permits the emitters to be formed accurately in shape and size as compared with the conventional technique of rotary deposition. This invention, therefore, realizes field emission cold cathodes which enjoy a high field emission efficiency and exhibit highly uniform characteristics and which can be obtained at a high yield with high productivity.

DESCRIPTION OF THE PREFERRED EMBODIMENTS

Now, the field emission cold cathode of this invention and the method for the production thereof will be described in detail below with reference to working examples illustrated in the annexed diagrams.

FIG. 1 and FIG. 2 are diagrams illustrating the structure of the principal part of a field emission cold cathode of this invention and a method for the production of the field emission cold cathode. FIG. 3 is a plan view illustrating the structure of the field emission cold cathode.

The principal part of the field emission cold cathode of this invention is formed as follows.

Figure 2F:
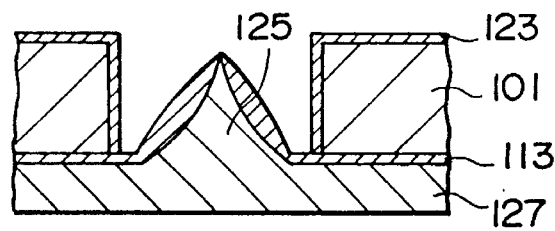
FIG. 2F through FIG. 2I are diagrams illustrating steps of the process for the production of the field emission cold cathode according to this invention from the formation of the second insulation layer up to the completion of the field emission cold cathode.
Figure 2G:
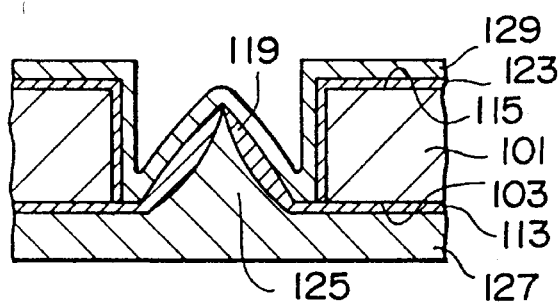
Figure 2H:
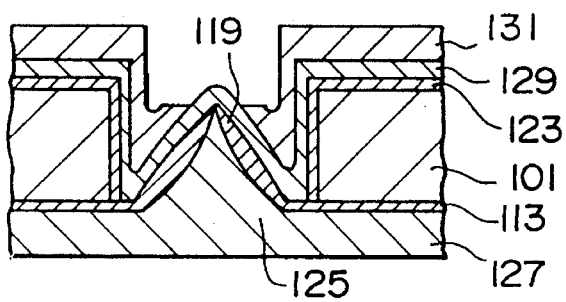
Figure 2I:
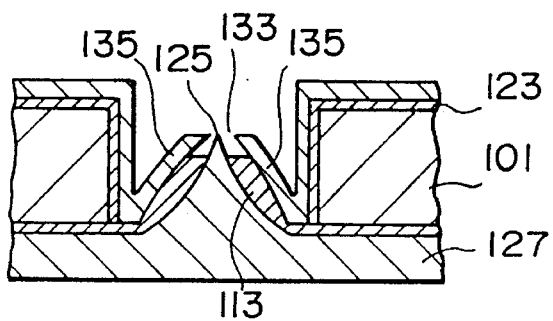
Figure 3:
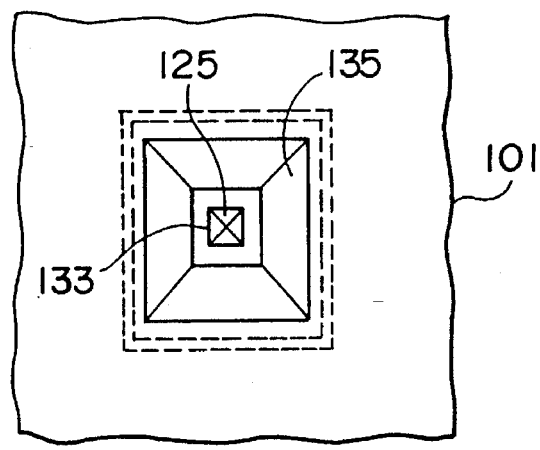
FIG. 3 is a diagram illustrating the structure of the field emission cold cathode according to this invention.

"As shown in FIG. 2I and FIG. 3, this is a field emission cold cathode designed to emit electrons through minute emitters of a projecting structure of the invention, which has a substrate 101 possessing a first main surface on one side of itself and a second main surface on the other side of itself, and has windows 117 formed on the second main surface. An emitter layer 127 is formed on the first main surface side of the substrate 101, and has emitters 125 disposed at the positions of the windows 117. A gate electrode layer 135 is formed on the second main surface side of the substrate 101. Openings 133 are so formed as to enclose the periphery of at least the leading end part of the emitters 125 without contact. The field emission cold cathode has an insulation layer 113 formed between the substrate 101 and the emitter layer 127, and between the emitter 125 and the gate electrode layer 135.

The leading end part of the emitters 125 are very sharp. One of the most important characteristics of the field emission cold cathode is that the gate electrode layer 135 is formed along the slope of the emitter 125 with insulation layer 113 formed between them.

So, an edge of the opening 133 of the gate electrode layer 135 is very near, but surely kept out of contact, with the leading end part of the emitter 125.

Consequently, those structures described above can project electrons very effectively from the leading end part of the emitter 125 by low operation voltage, without any trouble such as short circuiting within the emitter 125 and the gate electrode layer 135.

A hole 105 with sharp point in the bottom part thereof is incised on a first main surface 103 side of a silicon (Si) single crystal substrate 101. Ideally, the incision of this hole 105 is attained, for example, by a method using such anisotropic etching as shown below.

Figure 1A:
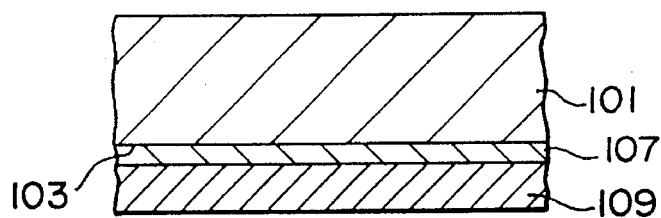
FIG. 1A through FIG. 1E are diagrams illustrating steps of a process for the production of a field emission cold cathode according to the present invention up to the formation of a second insulation layer in the field emission cold cathode.

First, a $SiO_2$ thermal oxidation layer 107 of a thickness of 0.1 μm is formed by the technique of dry oxidation on the first main surface 103 side of a p type silicon single crystal substrate 101 of crystal face orientation and a layer of resist 109 is further applied thereto by the technique of spin coating as illustrated in FIG. 1A.

Figure 1B:
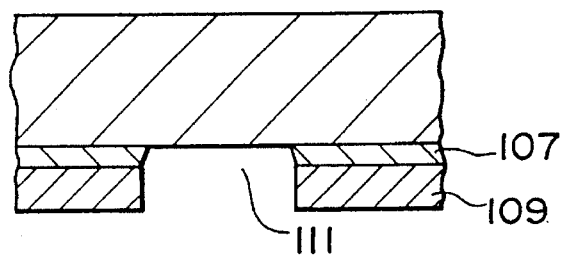

Then, the resist 109 is exposed through an opening pattern of the square of 1 μm to light by the use of a stepper, for example, and is developed to obtain a resist pattern containing the opening of the square of 1 μm as illustrated in Fig. 1B.

The $SiO_2$ thermal oxidation layer 107 is etched with a $NH_4F.HF$ mixed solution as an etchant to bore an opening 111. And, the resist 109 is peeled.

Figure 1C:
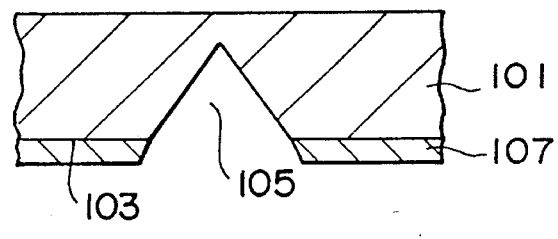

Subsequently, by performing anisotropic etching using the $SiO_2$ thermal oxidation layer 107 as a mask and an aqueous 30 wt % KOH solution as an etchant, a hole 105 measuring 0.71 μm in thickness and having the shape of an inverted pyramid sharply pointed in the bottom part thereof as illustrated in FIG. 1C is incised from the first main surface 103 side of the silicon single crystal substrate.

Figure 1D:
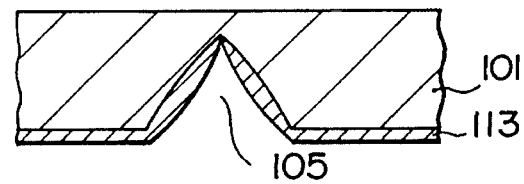

Then, the $SiO_2$ thermal oxidation layer 107 is removed with the $NH_4F.HF$ mixed solution and a first insulation layer 113 is formed on the first main surface 103 of the substrate 101 containing the hole 105 as illustrated in FIG. 1D.

In the present working example, the first insulation layer 113 is formed in the form of a $SiO_2$ thermal oxidation film 0.3 μm in thickness by oxidizing the surface layer of the first main surface 103 of the substrate 101 by the technique of wet oxidation.

By having the first insulation layer 113 formed by the technique of thermal oxidation as described above, the leading part of the hole 105 in the first insulation layer 113 acquires a highly desirable sharply pointed shape. As a result, the leading end part an emitter which will be obtained at a subsequent step (to be described specifically afterward) likewise acquires a highly desirable sharply pointed shape such that the field concentrating effect will be extremely exalted. Further, the technique of thermal oxidation is quite desirable because it ideally matches with the steps of an ordinary process for the manufacture of semiconductors and contributes to simplification of the process.

Figure 1E:
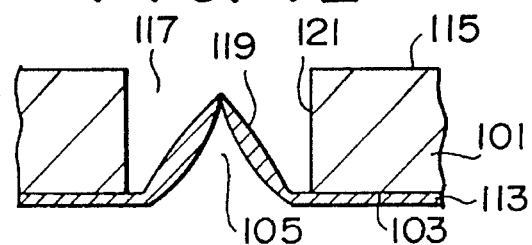

Then, a window 117 is incised from a second main surface 115 side opposite to the first main surface 103 side at the position corresponding to the hole 105 of the substrate 101 to expose a conical part 119 on the second main surface 115 side of the first insulation layer 113 through the window 117 as illustrated in FIG. 1E.

This window 117 is formed, for example, by applying a layer of resist to the second main surface 115 side of the substrate 101 thereby forming a pattern of the window 117 at the position corresponding to the hole 105 and then etching the substrate 101 against the resist pattern from the second main surface 115 side by the technique of reactive ion etching (RIE). This etching is carried out until the conical part 119 on the second main surface 115 side of the insulation layer 113 is exposed through the window 117.

Then, the resist mentioned above is peeled. Thereafter, the second main surface 115 side surface of the substrate 101 and the lateral wall 121 of the window 117 are subjected to thermal oxidation to form a second insulation layer 123 having a thickness of about 0.2 μm as illustrated in FIG. 2F.

Then, on the first main surface 103 side of the first insulation layer 113, an emitter layer 127 having an emitter 125 with sharp point in the leading end part thereof is formed in conformity with the shape of the first insulation layer 113 on the first main surface 103 side thereof.

In the present working example, the emitter layer 127 is formed by depositing tungsten (W) in the form of a layer 2 μm in thickness by the technique of spattering. Besides tungsten, such a material as molybdenum (Mo) which possesses an amply low work function for cold cathode can be advantageously used.

Subsequently, a gate electrode material layer 129 is formed so as to cover the second insulation layer 123 on the second main surface 115 side as well as the second main surface 115 side of the conical part 119 of the first insulation layer 113 exposed through the window 117 as illustrated in FIG. 2G. Such a metallic material as tungsten (W) is ideally used for the gate electrode material layer 129. In the present working example, the gate electrode material layer 129 is formed by depositing tungsten in the form of a layer 0.9 μm in thickness by the technique of spattering.

Then, a layer of photoresist 131 is applied to the surface of the gate electrode material layer 129 and this photoresist 131 is patterned so that at least the leading end part of the conical part 119 of the first insulation layer 113 is exposed through the gate electrode material layer 129 as illustrated in FIG. 2H. In the present working example, the patterning is effected to a point where the conical part 119 is exposed to a depth of about 0.7 μm from the tip thereof.

By removing the part of the gate electrode material layer 129 and the part of the first insulation layer 113 which both correspond to at least the leading end part of the emitter 125 thereby forming an opening 133 as illustrated in FIG. 2I depicting a cross section and FIG. 3 depicting a plan view, a gate electrode layer 135 enclosing untouched the surface of the emitter 125 including the leading end part thereof and, at the same time, allowing at least the leading end part of the emitter 125 to b exposed through the opening is formed out of the gate electrode material layer 129.

In the present working example, the gate electrode layer 135 is formed by first removing the part of the gate electrode material layer 129 which corresponds to the leading end part of the emitter 125 by the technique of RIE thereby forming the opening 133 and then selectively etching the first insulation layer 113 exposed through the opening 133 of the gate electrode material layer 129 and the photoresist (not shown) by the technique of photolithography using a $NH_4F.HF$ mixed solution as an etchant.

Then, the principal part of a device which uses the field emission cold cathode of this invention is formed by opposing an anode (not shown) to the leading end part of the emitter 125.

The field emission cold cathode of this invention the principal part of which is formed as described above is allowed to have the emitters thereof formed in accurate shape and size unlike the emitters obtained by the conventional method of rotary deposition because the emitters 125 can be formed by adopting as a pattern the first insulation layer 113 formed in conformity with the exact contour of the hole 105 and the window 117 formed by the step of photolithography such as anisotropic etching and filling the pattern with the material for the emitter layer 127.

Further, since the leading end of the conical part 119 of the first insulation layer 113 acquires a very sharply pointed shape owing to the adoption of the technique of thermal oxidation for the formation of the first insulation layer 113, the leading end part of the emitter 125 which is formed in conformity with the leading end of the conical part 119 likewise acquires a highly desirable sharply pointed shape enough to exalt the field concentrating effect conspicuously.

As a result, this invention realizes field emission cold cathodes which enjoy a high field emission efficiency and exhibit very uniform characteristics and which are manufactured at a high yield with high productivity.

The working example described above represents a case of having the emitter layer 127 adapted to serve concurrently as a cathode electrode and wiring thereof. Optionally, an independent electroconductive layer may be formed as the cathode electrode and wiring thereof separately of the emitter layer 127, depending on the material to be used for the emitter layer 127.

Figure 4:
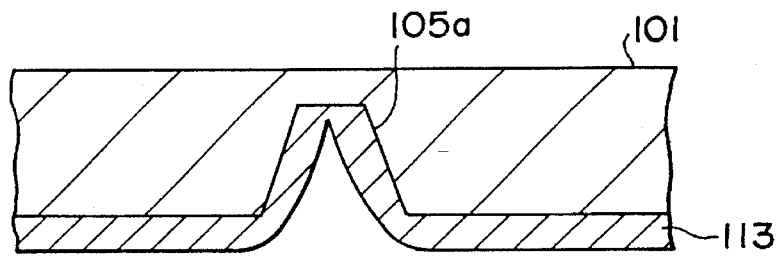
FIG. 4 is a diagram illustrating a method for production as another embodiment of this invention.
Figure 5:
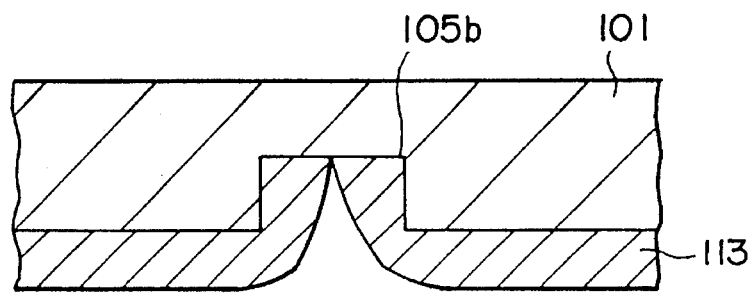
FIG. 5 is a diagram illustrating a method for production as yet another embodiment of this invention.

The working example cited above also represents a case of having the hole 105 incised in the shape of a reversed pyramid in the silicon single crystal substrate 101. The shape of the hole 105 is not limited to that which is sharply pointed in the bottom part. A hole 105a which has the shape of a truncated cone as shown in FIG. 4 and a hole 105b which has the shape of a rectangle as shown in FIG. 5 are also usable. Even in this case, when the technique of thermal oxidation is employed for the formation of the first insulation layer 113, this first insulation layer 113 is obtained so as to have formed therein a gap sharply pointed in the bottom part. Emitters having a sharply pointed shape can be formed by adopting the gap of this shape as a pattern and filling the pattern with the material for the emitter layer 127.

Optionally, this invention can be applied to the production of mono-atom emitters formed of one atom or to the production of several-atom emitters formed of a plurality of atoms.

Figure 6:
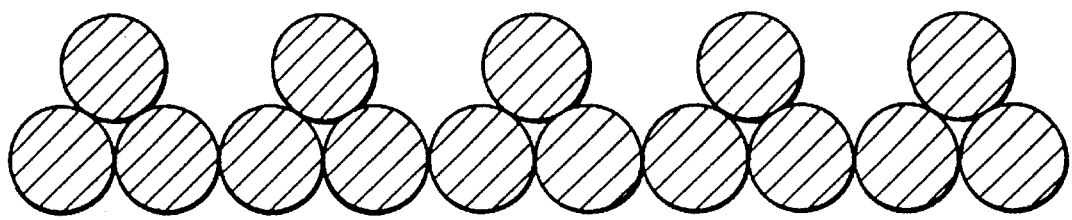
FIG. 6 is a diagram illustrating in the form of a model the structure of a mono-atom emitter.
Figure 7:
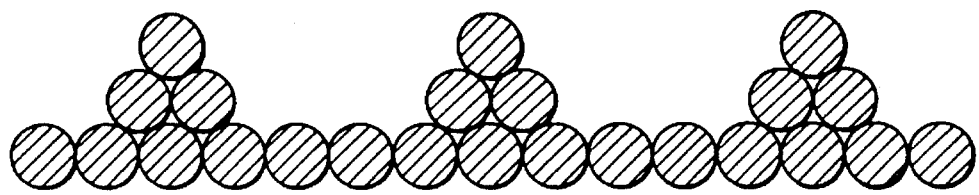
FIG. 7 is a diagram illustrating in the form of a model the structure of a four-atom emitter.
Figure 8:
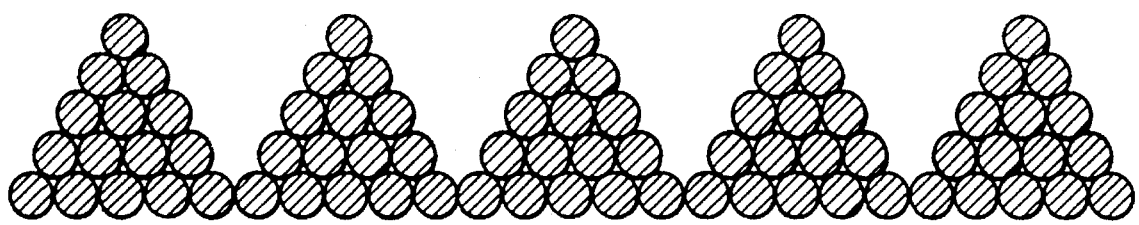
FIG. 8 is a diagram illustrating in the form of a model the structure of a multi-atom emitter.
Figure 9A:
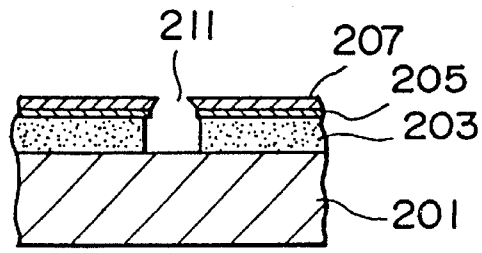
FIG. 9A through FIG. 9C are diagrams illustrating steps of the process for the production of a conventional field emission cold cathode.
Figure 9B:
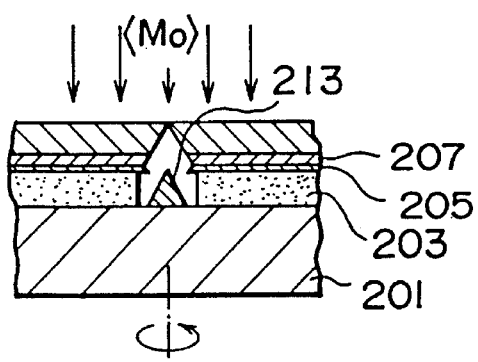
Figure 9C:
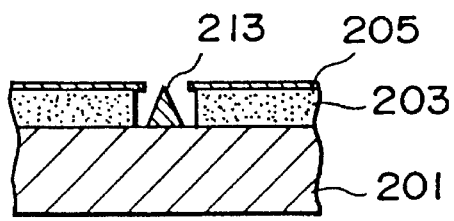

FIGS. 6 to 8 are models depicting the structures of such emitters, with each circle representing one atom. FIG. 6 represents mono-atom emitters formed of one atom apiece, FIG. 7 represents four-atom emitters formed of four atoms apiece, and FIG. 8 represents multi-atom emitters formed of a multiplicity of atoms apiece.

FIG. 7 shows three atoms. Actually, these three atoms each overlie three atoms which form a lower row. If FIGS. 6 to 8, emitters and emitter layers are illustrated and substrates and other components are omitted.

While there has been shown and described a working example of this invention, it is to be understood that the invention is not limited thereto but may be otherwise variously embodies and practiced within the scope of the following claims.

What is claimed is:

1. A field emission cold cathode designed to emit electrons through minute emitters of a projecting structure, comprising: a substrate possessing a first main surface on one side thereof and a second main surface on the other side thereof and an insulation layer formed between the substrate and an emitter layer, and between the emitter layer and a gate electrode layer and having windows formed on the second main surface, said emitter layer formed on said first main surface side of said substrate and having emitters disposed at the positions of said windows, and said gate electrode layer formed on said second main surface side of said substrate and having openings so formed as to enclose the periphery of at least a tip of each of said emitters without contact.

2. A field emission cold cathode according to claim 1, wherein said substrate is formed of a single crystal.

3. A field emission cold cathode according to claim 1, wherein said emitters are formed of one or a plurality of atoms apiece.

4. A field emission cold cathode, comprising: a single crystal substrate possessing a first main surface on one side thereof and a second main surface on the other side thereof and having windows formed on the second main surface, a first insulation layer formed on said first main surface side of said single crystal substrate, an emitter layer covering said first insulation layer on the first main surface side and possessing emitters each sharply pointed at least in a tip and formed in such a manner in said single crystal substrate that each said tip is exposed through said first insulating layer, a second insulating layer formed on said second main surface side surface of said substrate and on side walls of said windows in said substrate, and a gate electrode layer covering the surface of said second insulation layer and, at the same time, having formed therein openings enclosing the surface of at least the tip of each of said emitters and exposing said tips therethrough.

5. A field emission cold cathode according to claim 4, wherein said single crystal substrate is formed of a silicon single crystal.

* * * * *